United States Patent
Halbritter et al.

(10) Patent No.: US 11,475,261 B2
(45) Date of Patent: Oct. 18, 2022

(54) LIGHT EMITTING DEVICE FOR OPTICALLY REPRODUCING A CODED INFORMATION AND METHOD FOR OPERATING THE LIGHT EMITTING DEVICE

(71) Applicant: OSRAM OLED GmbH, Regensburg (DE)

(72) Inventors: Hubert Halbritter, Dietfurt-Toeging (DE); Peter Brick, Regensburg (DE)

(73) Assignee: OSRAM OLED GMBH, Regensburg (DE)

( * ) Notice: Subject to any disclaimer, the term of this patent is extended or adjusted under 35 U.S.C. 154(b) by 0 days.

(21) Appl. No.: 17/277,951

(22) PCT Filed: Sep. 18, 2019

(86) PCT No.: PCT/EP2019/074957
§ 371 (c)(1),
(2) Date: Mar. 19, 2021

(87) PCT Pub. No.: WO2020/058310
PCT Pub. Date: Mar. 26, 2020

(65) Prior Publication Data
US 2022/0129719 A1    Apr. 28, 2022

(30) Foreign Application Priority Data
Sep. 20, 2018 (DE) ............... 10 2018 123 171.7

(51) Int. Cl.
*G06K 19/06* (2006.01)
*G06K 7/10* (2006.01)

(52) U.S. Cl.
CPC .... *G06K 19/06112* (2013.01); *G06K 7/10732* (2013.01); *G06K 19/06084* (2013.01)

(58) Field of Classification Search
CPC .................... G06K 19/0608; G06K 19/0611
USPC .................................................. 235/1 R, 454
See application file for complete search history.

(56) References Cited

U.S. PATENT DOCUMENTS

| | | |
|---|---|---|
| 2012/0212149 A1 | 8/2012 | Forster et al. |
| 2015/0163881 A1 | 6/2015 | Pederson |
| 2015/0207849 A1 | 7/2015 | Chen et al. |
| 2015/0248603 A1 | 9/2015 | Lowenthal |

(Continued)

FOREIGN PATENT DOCUMENTS

| | | |
|---|---|---|
| DE | 20 2006 015 605 U1 | 2/2007 |
| DE | 20 2007 014 231 U1 | 2/2008 |
| DE | 10 2007 000 883 A1 | 5/2009 |

(Continued)

OTHER PUBLICATIONS

International Search Report issued for corresponding International Patent Application No. PCT/EP2019/074957 dated Oct. 30, 2019, along with an English translation.

(Continued)

*Primary Examiner* — Toan C Ly
(74) *Attorney, Agent, or Firm* — Hauptman Ham, LLP

(57) ABSTRACT

A light emitting device for optically reproducing a coded information includes a plurality of optical components. Each of the components is configured to emit light. The combination of the light emitted from the optical components provides coded information.

13 Claims, 4 Drawing Sheets

(56) References Cited

U.S. PATENT DOCUMENTS

Figure 1A:
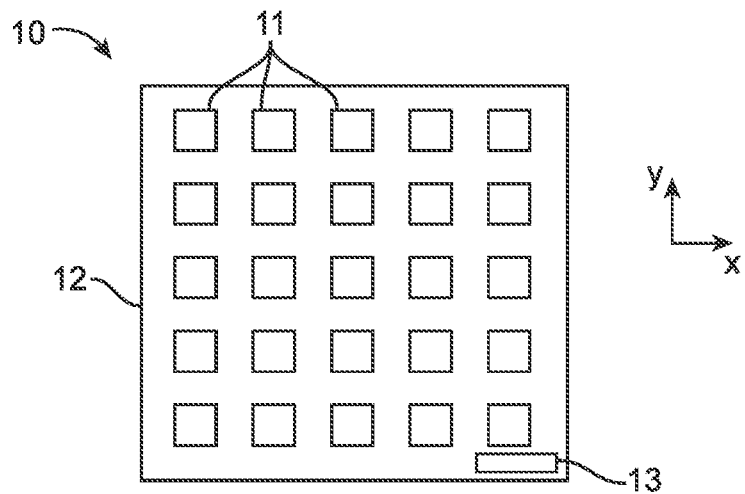

2017/0265258 A1\* 9/2017 Hurley ................ H05B 47/155

FOREIGN PATENT DOCUMENTS

| DE | 10 2007 000 889 A1 | 5/2009 |
|----|--------------------|--------|
| DE | 10 2016 105 502 A1 | 9/2017 |
| EP | 3 273 389 A1 | 1/2018 |
| TW | 201417015 A | 5/2014 |

OTHER PUBLICATIONS

Written Opinion issued for corresponding International Patent Application No. PCT/EP2019/074957 dated Oct. 30, 2019.

\* cited by examiner

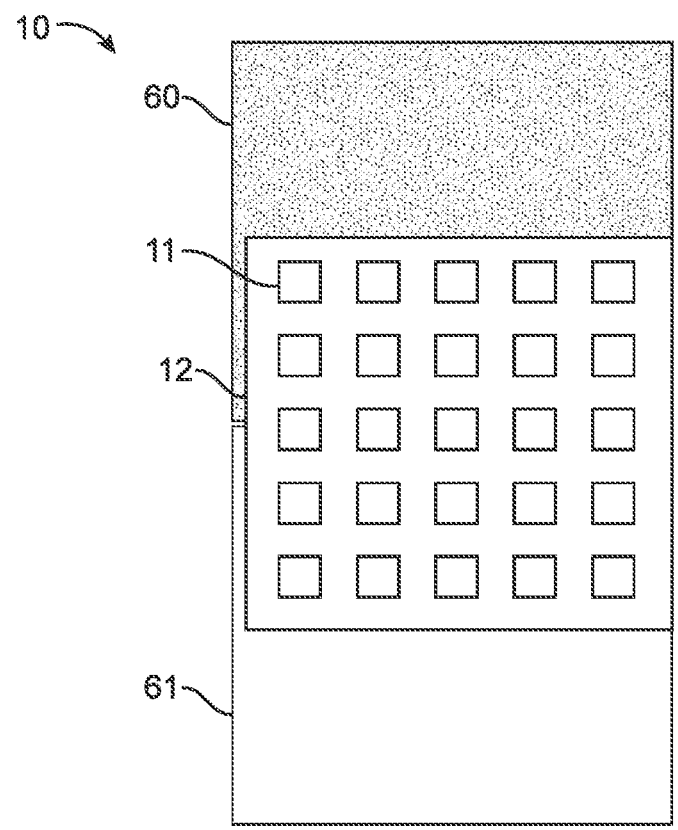
FIG. 6
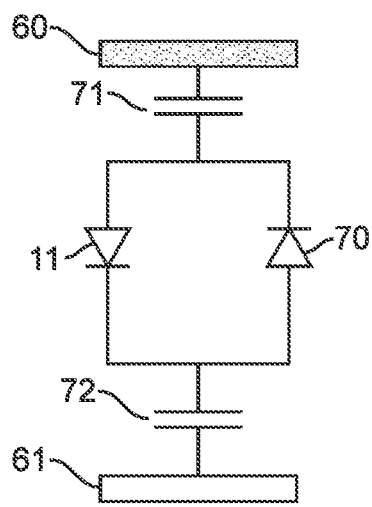 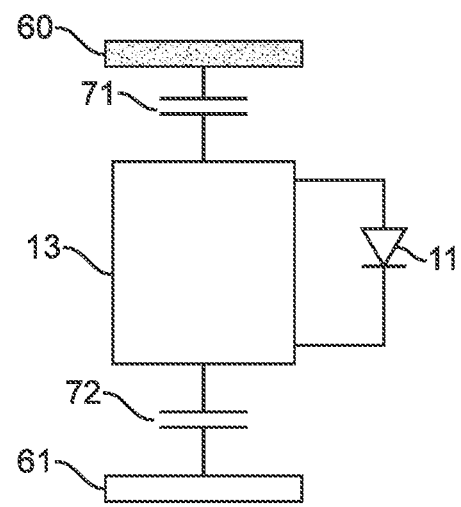
FIG. 7A FIG. 7B

LIGHT EMITTING DEVICE FOR OPTICALLY REPRODUCING A CODED INFORMATION AND METHOD FOR OPERATING THE LIGHT EMITTING DEVICE

CROSS REFERENCE TO RELATED APPLICATION

This application is a National Stage of International Application No. PCT/EP2019/074957, filed on Sep. 18, 2019, which designates the United States and was published in Europe, and which claims priority to German Patent Application No. 10 2018 123 171.7, filed on Sep. 20, 2018, in the German Patent Office. Both of the aforementioned applications are hereby incorporated by reference in their entireties.

The present invention relates to a light emitting device for optically reproducing a coded information and a method for operating the light emitting device. Furthermore, the invention relates to a system for optically reproducing a coded information.

The unique identification of products or processes is desirable, in particular to be able to detect product counterfeiting or tampering. RFID (radio-frequency identification) transponders and barcodes are used for this purpose, for example. However, both RFID transponders and barcodes can be easily manipulated.

The present invention is based, among other things, on the object of providing a device with which coded information can be displayed and which has an increased security against manipulation. Furthermore, a system comprising such a device and a method for operating the device are to be disclosed.

An object of the invention is solved by a light emitting device for optically reproducing a coded information having the features of claim 1. An object of the invention is further solved by a system for optically reproducing a coded information having the features of claim 10. Furthermore, an object of the invention is solved by a method for operating a light emitting device for optically reproducing a coded information having the features of claim 14. Preferred embodiments and further embodiments of the invention are given in the dependent claims.

A light emitting device for optically reproducing a coded information comprises a plurality of optical components. Each of the optical components is designed to emit light. The combination of the light emitted by the optical components results in the coded information.

The optical components, or the light emitted by the optical components, may or may not have certain properties that can be combined to form unique coded information.

For example, the light emitting device can be attached to a product, such as medications, airbags, identification cards, bills, or electronic products, or to a human or animal, such as a patient. The coded information may contain one or more unique pieces of information about the product or human or animal. By decoding the coded information using a suitable algorithm, this information can be obtained.

The coded information can, for example, be an authentication code and/or an identification code or comprise such a code. Accordingly, the light emitting device can be used to carry out a contactless and, if necessary, automatically authentication and/or identification process.

The coded information can contain blockchain information or a blockchain identification code. Blockchain information or blockchain identification codes can be identified or transferred by scanning.

The light emitting device can also be referred to as an optical tag. The term "tag" is borrowed from the English term "tag" and refers to a label, tag, sign or similar object which can be used to provide additional information to a product, for example.

The light emitting device may include a suitable fastener, such as an adhesive tape, for attaching the light emitting device to a product, another object, or a body. The light emitting device may be used to identify and/or authenticate products, processes, people, or animals.

The optical components can emit light in the visible range, ultraviolet (UV) light, and/or infrared (IR) light.

The light emitting device may contain a suitable number of optical components. For example, the light emitting device can contain at least 5, 10, 15, 20, 25 or 30 optical components. Even with just a few optical components, a large number of different codes can be generated combinatorially, with which information can be uniquely coded.

The optical components can be arranged in a so-called array, i.e. a regular arrangement of rows and columns. However, non-regular arrangements of the optical components are also conceivable.

The light emitting device can have dimensions in the µm range. In particular, each dimension of the light emitting device can be smaller than 1 mm.

The light emitting device has increased security against manipulation. The optical components can only be counterfeited or manipulated with great technical effort. In addition, only a few manufacturers are able to produce such components.

Since the concept of the light emitting device described in the present application is based on optical information transmission, the light emitting device can be used in areas where RFID transmitting or reading devices are not permitted, for example in radiation-protected rooms.

Data theft can be prevented in the case of the light emitting device by simply optically blocking the light path.

If the optical components or the light emitted by the optical components is/are coded on the hardware side, the coding cannot be revised or manipulated by means of a software program.

Since the present technology does not require antennas to transmit radio signals, a very small component size can be achieved.

The optical components may each have at least one optical converter layer or at least one quantum dot.

The converter layers, also called conversion layers, are configured to transform or convert light generated by an external light source into light of a different wavelength. The converter layers can contain converter particles, for example phosphor particles.

A quantum dot (QD) is a nanoscopic material structure, usually made of a semiconductor material, for example InGaAs, CdSe or GaInP/InP. Charge carriers in a quantum dot are restricted in their mobility in all spatial directions to such an extent that their energy can no longer assume continuous but only discrete values. Quantum dots thus behave similarly to atoms, but their shape, size or the number of electrons in them can be influenced. This allows electronic and optical properties of quantum dots to be tailored.

The converter layers and quantum dots can be excited or optically pumped with light of a specific wavelength or from a specific wavelength range, e.g. blue light or UV light. This light can be generated by an external light source. The excitation of the converter layers or quantum dots causes them to emit light whose color or wavelength is predetermined by the composition of the respective converter layer or quantum dot.

Consequently, the converter layers or quantum dots can emit light with different colors or wavelengths, whereby information can be coded.

Instead of converter layers or quantum dots, the optical components can each have an optoelectronic component that emits the desired light.

The optoelectronic components can be optoelectronic semiconductor components, in particular semiconductor chips. For example, the optoelectronic components can be light emitting diodes (LEDs), organic light emitting diodes (OLEDs), light emitting transistors or organic light emitting transistors. Furthermore, the optoelectronic components can be µLEDs, i.e. micro-LEDs. µLEDs have only a very thin substrate or no substrate at all, which makes it possible to manufacture them with smaller lateral dimensions per PLED. The optoelectronic components can also be parts of integrated circuits.

In addition to the optoelectronic components, other semiconductor components and/or other components may be integrated into the light emitting device.

The light emitting device can contain a control unit that is configured to control the optoelectronic components. For example, the control unit can control the sequence in which the optoelectronic components emit light one after the other. Furthermore, the control unit can control the optoelectronic components in such a way that the optoelectronic components generate modulated light signals. The light sequence or the modulated light signals can be used to encode a desired piece of information. Furthermore, it may be provided that the control unit applies a supply voltage to the optoelectronic components. The control unit can be designed as an integrated circuit, for example an application-specific integrated circuit (ASIC).

The light emitting device may have at least one photodiode configured to convert light into an electric current. The current generated by the at least one photodiode can be used to supply power to the optoelectronic components.

The at least one photodiode may be excited by an external light source that generates IR light, for example.

The light emitting device may include a carrier on which the optoelectronic components and, in particular, the at least one photodiode are arranged. The at least one photodiode can also be integrated into the carrier. Furthermore, the control unit and possibly further components may be arranged on the carrier. It may further be provided that on one side of the carrier the plurality of optoelectronic components are arranged and the remaining surface of this side of the carrier or at least a part of this surface is covered by the at least one photodiode or is designed as the at least one photodiode. The carrier may, for example, be made of silicon, plastic, glass or foil.

The optoelectronic components can also be designed in such a way that they can be excited or pumped with light, e.g. blue light or UV light, so that they can then emit light themselves. The light required to excite the optoelectronic components can be generated by an external light source. In this embodiment, the presence of electronics for power supply is not required.

Furthermore, it is possible to apply an external electrical supply voltage to the light emitting device. In this case, the light emitting device contains at least two electrical contact elements to which the supply voltage is applied. The optoelectronic components can be connected in series, for example, and the supply voltage can be applied to the series connection. Alternatively, the supply voltage can be applied to the control unit, which is designed as an ASIC, for example, and the control unit supplies each of the optoelectronic components with a suitable operating voltage.

The at least two electrical contact elements can be arranged on the carrier. Furthermore, the at least two electrical contact elements can be arranged laterally of the carrier as contact electrodes. The contact electrodes can be designed with a large surface area, for example with a contact area of at least 1 cm$^2$ each. The large surface area design of the contact electrodes allows simple and reliable contacting of the contact electrodes by an external voltage supply. The contact electrodes can be made of an electrically conductive foil.

The coded information may result from the characteristics of the optical components and/or the characteristics of the light emitted by the optical components. For example, the coded information can result from the colors of the light emitted by the optical components and/or the optical output power of the optical components and/or the decay time of the optical components and/or the rise time of the optical components and/or the order in which the optical components emit light one after the other and/or the arrangement of the optical components and/or the distances between the optical components.

The color of the light emitted by an optical component is given by the wavelength or the wavelength range of the emitted light. Different color combinations can be used to represent different coded information.

The optical output power of an optical component determines the brightness of the emitted light.

The decay time of an optical component indicates the period of time during which a converter layer of the optical component remains luminescent after the optical component is switched off.

The rise time of an optical component indicates the time period required by a converter layer of the optical component to generate light, in particular white light, after the optical component is switched on. Decay and rise times are typically in the ns to µs range.

For example, the arrangement of the optical components may involve the angle or angles at which the optical components are oriented with respect to each other, or the pattern in which the optical components are arranged, or the shape in which the optical components are arranged, such as a rectangular or square shape.

With the above-described properties or also further properties of the optical components and/or of the light emitted by the optical components, different combinations can be formed, the combinations differing in each case in at least one property of the optical components and/or of the light emitted by the optical components. Each of the different combinations may represent a respective coded information.

A system for optically reproducing a coded information comprises a light emitting device, which may have the embodiments described above. In addition, the system comprises a power supply device for supplying power to the light emitting device.

The power supply device can be, for example, a power supply that provides a supply voltage to the electrical contact elements. Further, the power supply device may be configured to emit light at a predetermined wavelength or wavelengths in a predetermined wavelength range. For example, the power supply device may generate IR light to excite the at least one photodiode described above. Further, the power supply device may be configured as a light source for generating blue light or UV light, which may be used in particular for exciting the converter layers or the quantum dots.

The system may include a reading device for recording the light emitted from the optical components of the light emitting device. The reading device may be, for example, a camera, such as a cell phone camera or otherwise configured camera, or a scanner.

Furthermore, the system may comprise a decoding device for decoding the coded information. The decoding device may, for example, receive one or more recordings and/or a video of the light emitting device from the reading device and decode the information therefrom by means of a suitable decoding algorithm. The decoding device can be a hardware device, but it can also be software accessible via the Internet, for example stored in a so-called cloud, i.e., a computer or data cloud.

A method of operating the light emitting device described above comprises emitting light from the optical components of the light emitting device, and recording the light emitted from the optical components by means of a reading device, such as a camera or a scanner.

The method of operating the light emitting device may include the above-described embodiments of the light emitting device and the system for optically reproducing the coded information.

The method can be designed in such a way that the coded information is decoded using the light emitted by the optical components and recorded by the reading device.

Figure 1B:
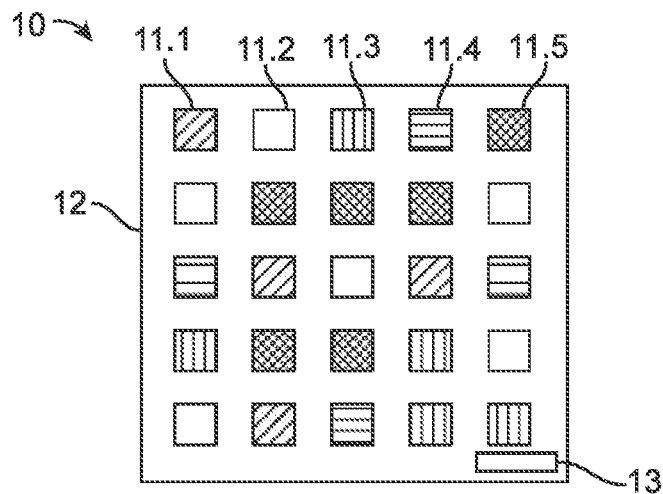
Figure 1C:
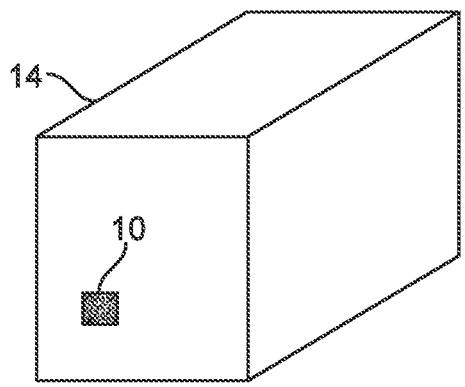
Figure 2:
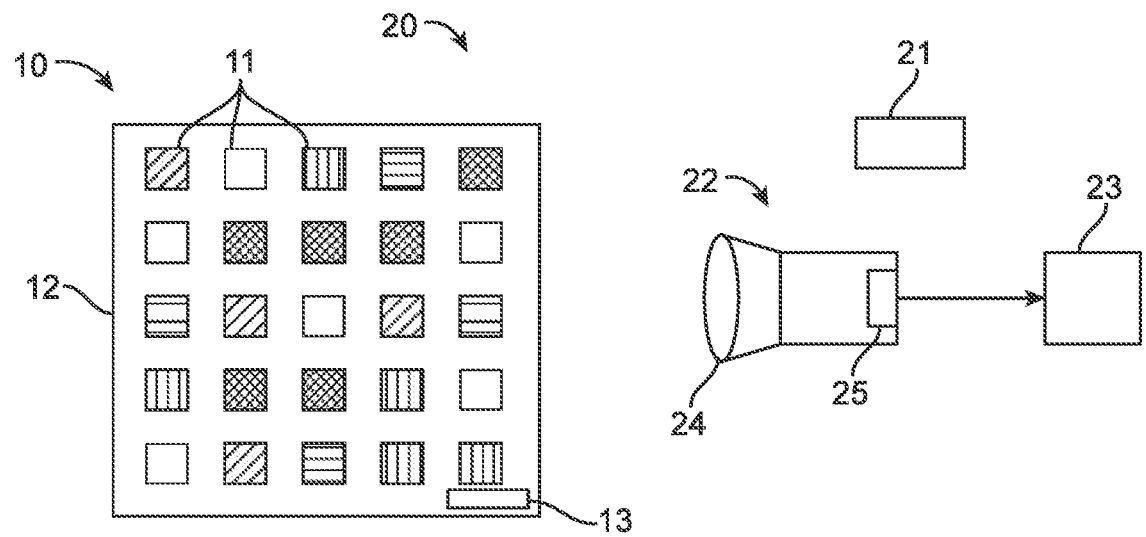
Figure 3:
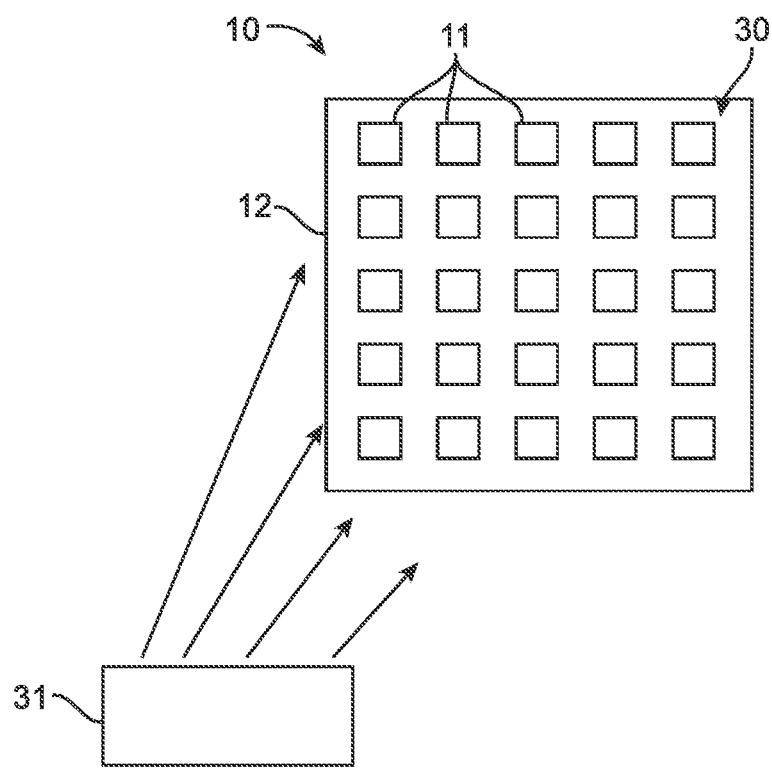
Figure 4:
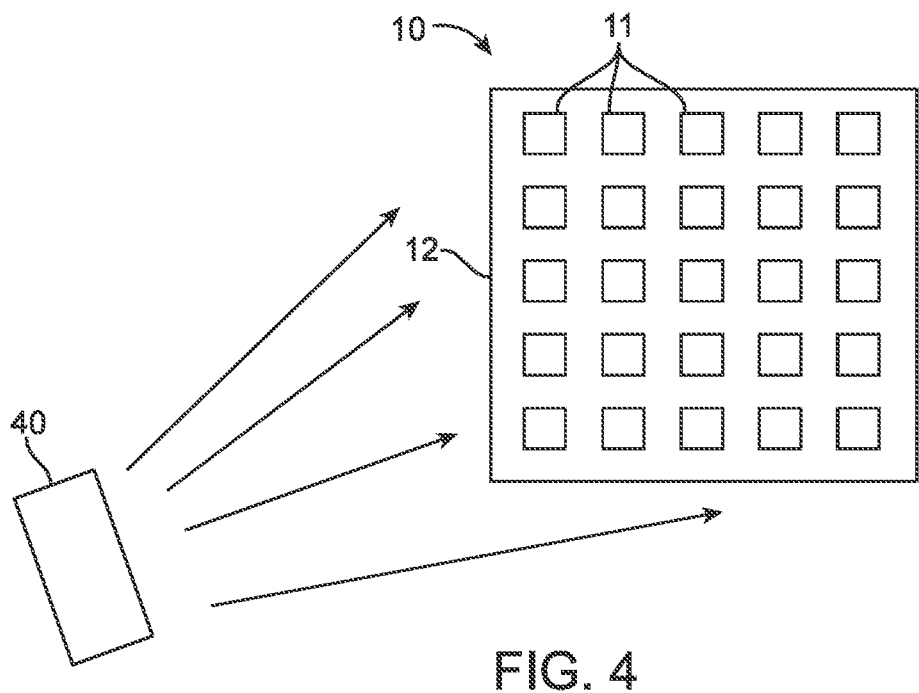
Figure 5:
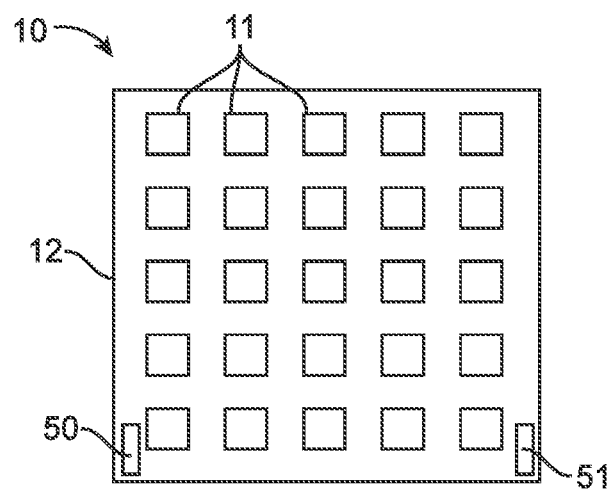

In the following, embodiments of the invention are explained in more detail with reference to the accompanying drawings. In these schematically show:

FIGS. 1A to 1C illustrations of an embodiment of a light emitting device for optically reproducing a coded information;

FIG. 2 an illustration of an embodiment of a system for optically reproducing a coded information;

FIG. 3 an illustration of an embodiment of a light emitting diode with a photodiode;

FIG. 4 an illustration of an embodiment of a light emitting diode with optically excitable optical components;

FIG. 5 an illustration of an embodiment of a light emitting diode with electrical contact elements;

FIG. 6 an illustration of an embodiment of a light emitting diode with contact electrodes; and FIGS. 7A and 7B representations of embodiment examples of circuits for supplying voltage to the optoelectronic components.

In the following detailed description, reference is made to the accompanying drawings, which form a part of this description and in which specific embodiments in which the invention may be practiced are shown for illustrative purposes. Since components of embodiments may be positioned in a number of different orientations, the directional terminology is for illustrative purposes and is not limiting in any way. It is understood that other embodiments may be used and structural or logical changes may be made without departing from the scope of protection. It is understood that the features of the various embodiments described herein may be combined with each other, unless specifically indicated otherwise. Therefore, the following detailed description is not to be construed in a limiting sense. In the figures, identical or similar elements are provided with identical reference signs where appropriate.

FIG. 1A schematically shows a light emitting device 10 for optically reproducing a coded information in a top view from above. The light emitting device 10 comprises a plurality of optical or optoelectronic components, which in the present embodiment are designed as LEDs 11.

The LEDs 11 are μLEDs and arranged in a regular, rectangular arrangement of rows and columns. The arrangement of the LEDs 11 is similar to the arrangement of μLEDs in a μ-display, i.e. a micro display.

The LEDs 11 are mounted on a carrier 12. The carrier 12 may be made of silicon, plastic, glass, or foil, for example. The carrier 12 may further contain logic or additional circuits. In FIG. 1A, a schematically shown control unit 13 is arranged on the carrier 12, which is designed as an ASIC. The carrier 12 can have dimensions in the x and y directions shown in FIG. 1A of, for example, 100 μm×100 μm or 500 μm×500 μm.

The LEDs 11 are arranged in a 5×5 matrix and are flip chips, i.e., the LEDs 11 have all electrical contact elements on their bottom sides. Each of the LEDs 11 may have a converter layer to produce a desired color. The LEDs 11 may have dimensions in the x and y directions of less than 20 μm×20 μm.

By means of the light emitting device 10, coded or encoded information can be reproduced optically. The combination of the light emitted by the LEDs 11 provides the coded information.

The LEDs 11, or the light emitted by the LEDs 11, may or may not have certain characteristics that can be combined to provide unique information.

For example, the coded information can result from the colors or wavelengths of the light emitted by the LEDs 11. If the LEDs 11 can generate light with five different wavelengths, a total of $5^{25}=3\times10^{17}$ different codes can be reproduced by the 25 LEDs 11.

In FIG. 1B, the light emitting device 10 is shown during operation. The LEDs marked with 11.1, 11.2, 11.3, 11.4 and 11.5, respectively, each generate light of a particular color, e.g., the colors red, green, blue, yellow and white. A certain coded information is reproduced by the color pattern of the LEDs 11.

The coded information may also result from other properties of the LEDs 11 and/or the emitted light. For example, the coded information can result from the optical output power of the LEDs 11 and/or the decay time of the LEDs 11 and/or the rise time of the LEDs 11 and/or the order in which the LEDs 11 emit light one after the other and/or the arrangement of the LEDs 11 and/or the distances between the LEDs 11.

As exemplified in FIG. 1C, the light emitting device 10 can be attached to a product 14. For example, the light emitting device 10 may have an adhesive film on its backside for attaching the light emitting device 10 to the product 14.

The coded information, which is visually reproduced by the light emitting device 10, may contain one or more unique pieces of information about the product 14. By decoding the coded information using a suitable algorithm, this information can be read. Micro-optoelectronic encoding of information about the product 14 allows identification or authentication and, in particular, makes product counterfeiting more difficult.

FIG. 2 schematically shows a system 20 for optically reproducing a coded information. In addition to the light emitting device 10 described above, the system 20 comprises a power supply device 21, a reading device in the form of a camera 22 and a decoding device 23.

The power supply device 21 is used to supply power to the light emitting device 10, and is explained in more detail below in connection with the embodiments shown in FIGS. 3 to 7.

The camera 22 records one or more images and/or a video of the light signals emitted by the light emitting device 10, for example, the light pattern shown in FIG. 1B, and transmits the corresponding data to the decoding device 23. The camera 22 includes, for example, a macro or zoom lens 24 and a CMOS/CCD RGB camera chip 25 having p pixels if the light emitting device 10 produces the colors red, green, and blue.

The decoding device 23 decrypts or decodes the coded information from the data received from the camera 22 using a suitable decoding algorithm. The decoding device 23 may be a hardware device, but it may also be software stored in a cloud, for example. The decoding device 23 may further perform a verification of an identity and/or an authentication. Further information may be used for this purpose, for example GPS (global positioning system) location information and/or time stamps. The information obtained by the decoding device 23 may be forwarded to another device. Further, the decoding device 23 may be monitored and/or modified by another device.

In FIG. 3, a further embodiment of the light emitting device 10 is shown. In the embodiment, the surface of the carrier 12 which is not covered by the LEDs 11, or at least a part of this surface, is designed as one or more photodiodes 30. The power supply device in this case is a light source 31 that generates IR light to excite the photodiodes 30. The photodiodes 30 convert the IR light into an electric current that can be used to power the LEDs 11.

The current requirement of the LEDs 11 designed as µLEDs is about 1 µA per LED 11. Consequently, about 25 µA is required to operate the 25 LEDs 11 of the light emitting device 10. The photosensitivity to IR light for silicon photodiodes is about 0.6 A/W. To be able to generate the required voltage, 3 photodiodes 30 can be connected in series, for example. Consequently, an optical power of about 125 µW is required to excite the photodiodes 30.

An additionally mounted p photodiode may be provided as a detector for the optical excitation. If the light emitting device 10 includes a control unit 13, the control unit 13 can be supplied with power from the photodiodes 30.

In the further embodiment of the light emitting device 10 shown in FIG. 4, the LEDs 11 are configured such that they can be excited or pumped with light, such as blue light or UV light, to subsequently emit light. The light for exciting the LEDs 11 is generated by a light source 40.

Instead of LEDs 11, converter layers or quantum dots can be used as optical components in the embodiment shown in FIG. 4. The converter layers and quantum dots can be excited with the light from the light source 40. For example, p phosphor chips that glow in the corresponding phosphor color can be used.

In the embodiment of the light emitting device 10 shown in FIG. 5, the energy for supplying the light emitting device 10 is provided by a power supply (not shown). The electrical supply voltage can be applied to electrical contact elements 50 and 51 arranged on the carrier 12.

Provided that the 25 LEDs 11 of the light emitting device 10 are connected in series, a current of, for example, 1 µA and a supply voltage of, for example, a maximum of about 75 V are required.

If the light emitting device 10 contains a control unit 13 designed as an ASIC, the supply voltage of 3.3 V, for example, can also be applied to the control unit 13. The control unit 13 then supplies each of the LEDs 11 with the required operating voltage.

In FIG. 6, the light emitting device 10 is supplied with an electrical supply voltage from a power supply in the same way as in FIG. 5. However, instead of the electrical contact elements 50 and 51 arranged on the carrier 50, large surface area, electrically conductive contact electrodes 60 and 61 are provided. The contact electrodes 60 and 61 may have a contact area of about 1 cm² each and may be made, for example, of an electrically conductive foil.

For example, an alternating voltage can be applied to the contact electrodes 60 and 61. Circuits that can be used to generate an operating voltage for the LEDs 11 from the alternating voltage are shown in FIGS. 7A and 7B.

In the circuit shown in FIG. 7A, each LED 11 is connected in parallel with a diode 70 for protection against electrostatic discharge (ESD). This parallel circuit is connected to the contact electrode 60 via a capacitor 71 and to the contact electrode 61 via a capacitor 72.

In FIG. 7B, the control unit 13 designed as an ASIC is connected to the contact electrodes 60 and 61 via the capacitors 71 and 72. The control unit 13 applies the required operating voltage to each LED 11.

The alternating voltage required to operate the light emitting device 10 can be estimated as follows. Assuming that capacitors 71 and 72 have an area A of 10 mm×10 mm=100 mm² and a plate spacing d of 0.5 cm. Further, air being the dielectric between the capacitor plates. Then the capacitance C is approximately $1.8 \times 10^{-13}$ F.

For the current i, $i = C \times dv/dt$, i.e. $i/C = dv/dt$. With a current i of 1 µA and a capacitance C of approximately $1.8 \times 10^{-13}$ F, $i/C = dv/dt = 5 \times 10^6$ A/F consequently applies. Accordingly, a few volts should be sufficient as an alternating amplitude at a frequency of 10 MHz for operation of the light emitting device 10.

LIST OF REFERENCE SIGNS

10 Light emitting device
11 LED
11.1 LED
11.2 LED
11.3 LED
11.4 LED
11.5 LED
12 Carrier
13 Control unit
14 Product
20 System
21 Power supply device
22 Camera
23 Decoding device
24 Macro or zoom optics
25 CMOS/CCD RGB camera chip
30 Photodiode
31 Light source
40 Light source
50 Contact element
51 Contact element
60 Contact electrode
61 Contact electrode
70 Diode
71 Capacitor
72 Capacitor

The invention claimed is:

1. A Light emitting device for optically reproducing a coded information, with
   a plurality of optical components, each of the components being configured to emit light, and the combination of light being emitted by the optical components provides a coded information,
   wherein the optical components are configured such that the optical components emit light when excited or pumped with light from an external light source,
   wherein the optical components each comprise an optoelectronic component, and
   wherein the light emitting device comprises at least one photodiode configured to convert light into an electric current that serves to supply power to the optoelectronic components.

2. The light emitting device of claim 1, wherein the optical components each comprise at least one optical converter layer or at least one quantum dot.

3. The light emitting device according to claim 1, wherein the light emitting device comprises a control unit which is configured to control the optoelectronic components.

4. The light emitting device according to claim 1, wherein the light emitting device comprises a carrier on which the optoelectronic components and the at least one photodiode are arranged.

5. The light emitting device according to claim 1, wherein the optoelectronic components are configured in such that they are excited by light.

6. The light emitting device according to claim 1, wherein the light emitting device comprises at least two electrical contact elements for applying a supply voltage.

7. The light emitting device according to claim 1, wherein the coded information results from the colors of the light emitted by the optical components and/or the optical output power of the optical components and/or the decay time of the optical components and/or the rise time of the optical components and/or the order in which the optical components emit light and/or the arrangement of the optical components and/or the distances between the optical components.

8. A system for optically reproducing a coded information, with
   a light emitting device for optically reproducing coded information according to claim 1, and
   a power supply device for supplying power to the light emitting device.

9. The system according to claim 8, wherein the power supply device is configured to emit light having a predetermined wavelength or wavelengths in a predetermined range.

10. The system according to claim 8, wherein the system comprises a reading device for recording the light emitted by the light emitting device.

11. The system according to claim 8, wherein the system comprises a decoding device for decoding the coded information.

12. A method for operating a light emitting device for optically reproducing a coded information according to claim 1, wherein
    the optical components emit light and the light emitted by the optical components is recorded by means of a reading device.

13. The method of claim 12, wherein the coded information is decoded based on the light emitted from the optical components and recorded by the reading device.

* * * * *